United States Patent [19]

van Dijk

[11] 4,027,000
[45] May 31, 1977

[54] PROCESS FOR HALOGEN PRODUCTION
[75] Inventor: Christiaan P. van Dijk, Westfield, N.J.
[73] Assignee: Pullman Incorporated, Chicago, Ill.
[22] Filed: Dec. 22, 1975
[21] Appl. No.: 642,843

Related U.S. Application Data

[63] Continuation of Ser. No. 466,574, May 3, 1974, abandoned.
[52] U.S. Cl. .............................. 423/507; 423/386; 423/388; 423/400; 423/401; 423/405; 423/502
[51] Int. Cl.$^2$ .......................................... C01B 7/04
[58] Field of Search .......... 423/507, 502, 388, 400, 423/401, 405, 386

[56] References Cited

UNITED STATES PATENTS

| | | | |
|---|---|---|---|
| 3,152,870 | 10/1964 | Baumgartner et al. | 423/507 |
| 3,449,079 | 6/1969 | Jongenburger et al. | 423/506 |
| 3,451,776 | 6/1969 | van Dijk et al. | 423/502 |

*Primary Examiner*—Jack Cooper
*Attorney, Agent, or Firm*—Kurt S. Myers; C. W. Crady

[57] ABSTRACT

Chlorine or bromine are produced from the respective hydrogen halide in a reaction system, wherein a stoichiometric excess of active nitrogen is maintained within the reaction system over the amount of hydrogen halide in the system. Preferably the reaction system is a single tower wherein sulfuric acid is introduced to the top of the tower where it absorbs the active nitrogen while conditions are so set that at the bottom of the tower the gases, introduced there, strip the active nitrogen away from the acid. It is a further characteristic of the process, that the nitrogen compounds stripped at the bottom, are mainly stripped as a mixture of nitrogen monoxide and nitrogen dioxide. A major portion of the nitrogen monoxide stripped, is oxidized with the oxygen, present in the gases fed in the bottom, to form nitrogen dioxide. If hydrogen halide is fed in the bottom, it will also strip nitrogen compounds, but mostly in the form of nitrosyl-halide. Oxidation of nitrosyl-halide with oxygen, either direct or indirect (via decomposition of the nitrosyl-halide into nitrogen monoxide and chlorine), does not play a significant role in the present process. In the reaction section of the process, where practically all the halogen is formed, the characteristic phenomena is, that the chlorine or bromine made there in gas phase, is all formed by reaction of nitrogen dioxide and hydrogen halide or nitrosyl-halide, while the sulfuric acid absorbs the active nitrogen compounds mainly in the form of nitrosylsulfuric acid, thus helping the reaction to proceed. A small amount of hydrogen halide is preferably left unconverted.

14 Claims, 5 Drawing Figures

PROCESS FOR HALOGEN PRODUCTION

This is a continuation of application Ser. No. 466,574 filed May 3, 1974 now abandoned.

BACKGROUND OF THE INVENTION

1. Field of the Invention

The present invention is directed to a process for the production of bromine or chlorine from the respective hydrogen halide. The present invention may utilize either anhydrous hydrogen halide or an aqueous mixture which is preferably evaporated and added to the reaction system as a mixture of steam and the hydrogen halide. In the process of the present invention of stoichiometric excess of active nitrogen is maintained within the reaction system over the hydrogen halide introduced to the system. Sulfuric acid is introduced to the top of the reaction system and flows counter-currently to the hydrogen halide introduced to the system. Temperature and acid strength are regulated to allow stripping of nitrogen monoxide and nitrogen dioxide in the bottom of the reaction system. Oxygen in the feed gases reacts with nitrogen monoxide, leaving part of the nitrogen monoxide unconverted. At a higher zone in the reaction system the nitrogen dioxide reacts with hydrogen halide and/or nitrosyl-halide and nitrogen monoxide and sulfuric acid to produce halogen gas which is recovered as a gas and nitrosylsulfuric acid which becomes part of the liquid phase stream. In a preferred form of the process hydrogen halide is fed almost at the bottom of the system, thus also stripping nitrogen compounds out of the acid stream, mainly consisting of nitrosyl-halide. Reaction of this nitrosyl-halide with oxygen is of no or little importance in the present process.

2. Prior Art

The following U.S. Patents are related to processes for the production of a halide from the respective hydrogen halide wherein both sulfuric acid and active nitrogen compounds are present: U.S. Pat. Nos. 537,508; 1,930,664; 3,131,028; 3,152,866; 3,201,201; 3,449,079; 3,451,776; 3,544,274.

A process for the production of halogen from the respective hydrogen halide has been commercialized which utilizes the recycle of sulfuric acid, however, the process utilizes catalytic amounts of active nitrogen. The process is set forth in FIG. 1 which is a process flow arrangement wherein gaseous anhydrous hydrogen chloride feed is converted to gaseous chlorine of high purity. Basically, four steps are employed in this process for the conversion of HCl to gaseous chlorine:

Recycle-acid stripping
Oxidation
Absorption-oxidation
Recycle-acid flashing

After conversion, the chlorine gas can be dried and liquefied by standard procedures. Each of the steps employed in this prior art process will be described in further detail hereinafter.

Recycle-Acid Stripping — In this operation gaseous feed HCl contacts, countercurrently, a hot aqueous sulfuric acid stream of about 80% concentration, which contains the water of reaction and catalyst, taken up in the absorber. The catalyst, mainly present in the form of nitrosylsulfuric acid, is stripped from the acid by the predominant reaction:

$$HNSO_5 + HCl \rightarrow NOCl + H_2SO_4 \tag{1}$$

In the next lower section of the stripper, oxygen is introduced to strip out the small amount of HCl, which has gone into solution. The acid stream leaves the stripper carrying the water of reaction and only traces of $HNSO_5$.

Oxidation — The gas stream from the stripper contains NOCl, excess HCl, oxygen, and a small amount of water, which has been stripped from the hot acid. At the temperature of the stripper this gas reacts slowly, owing to the very limited partial pressure of NO. In the oxidizer, in the absence of the sulfuric acid stream, the gas first is warmed up to increase the rate of NOCl decomposition. Once this reaction kicks off, the highly exothermic oxidative reactions take place and heat has to be removed in order for the reaction to proceed to the desired conversion. Both heat input and heat removal are carried out by heat exchange. The reactions involved can be represented by:

$$2NOCl \rightarrow 2NO + Cl_2 \tag{2}$$
$$2NO + O_2 \rightarrow 2NO_2 \tag{3}$$
$$NO_2 + 2HCl \rightarrow NO + Cl_2 + H_2O \tag{4}$$

For practical purposes, oxygen consumption is limited to the oxidizer, which means that a sufficiently large volume for the oxidation reactions has to be provided to obtain the desired oxygen conversion.

Absorption-Oxidation — As a result of the oxidation reactions, the amounts of HCl and NOCl are greatly reduced and the reversal of reaction 1 is favored when the oxidizer effluent gas is contacted with the circulating acid stream. NOCl is absorbed in the countercurrent acid-gas contacting, provided in the absorber-oxidizer. There, not only is the catalyst recovered from the gas stream, but also most of the remaining HCl is oxidized to chlorine:

$$NO_2 + 2HCl \rightarrow NO + Cl_2 + H_2O \tag{4}$$
$$NOCl + H_2SO_4 \rightarrow HCl + HNSO \tag{5}$$
$$NO + NO_2 + 2H_2SO_4 \rightarrow 2HNSO_5 + H_2O \tag{6}$$

It has been proven in long duration pilot plant operations, that through the reactions described it is quite feasible to obtain 99 + % conversion of HCl to chlorine with negligible catalyst loss and a relatively low excess of oxygen. Product gas from this operation is cooled and dried with a small stream of cold sulfuric acid. Subsequent chlorine gas treatment depends upon the particular requirements of the chlorine consumer.

Recycle-Acid Flashing — Sulfuric acid from the stripper bottom contains all of the water of reaction. This is removed by an adiabatic flash to a vacuum set by the stripper bottoms temperature and the desired acid strength.

After flashing, the acid stream is ready for recycling to the absorber-oxidizer. Most of the acid is recycled hot, while a small amount is cooled to provide cooling medium for the product gas at the top of this tower. In effect, the heat of absorption of reaction water vapor supplied the heat of desorption and no added heat supply is required. The heat, removed from the oxidizer and from the cooled acid recycle, is essentially equal to the overall reaction heat of forming chlorine gas.

SUMMARY OF THE INVENTION

The present invention is directed to a process for producing chlorine or bromine from the respective hydrogen halide in a reaction system wherein a stoichiometric excess of active nitrogen is maintained within the system over the amount of hydrogen halide introduced to the system. The process involves introducing sulfuric acid to the top of the reaction system and introducing the hydrogen halide in countercurrent flow to the sulfuric acid. In a reaction zone within the reaction system a stoichiometric amount of nitrogen dioxide is reacted with the hydrogen halide or nitrosyl-halide to be reacted to produce the chlorine or bromine which flows out of the system as the gaseous phase stream and nitrosylsulfuric acid which forms part of the liquid phase stream. The nitrosylsulfuric acid produced is reacted in a regenerating zone of the reaction system to regenerate a mixture of nitrogen monoxide and nitrogen dioxide and oxygen is introduced to the regenerating zone to oxidize the nitrogen monoxide to nitrogen dioxide. The gas at this point contains considerably more moles of nitrogen dioxide and nitrogen monoxide than the total moles of hydrogen halide introduced into the system.

DESCRIPTION OF THE PREFERRED EMBODIMENTS

The present invention is directed to a process for producing chlorine or bromine from the respective hydrogen halide in a reaction system wherein a stoichiometric excess of active nitrogen is maintained within the system with respect to the hydrogen halide introduced to the system. The active nitrogen exists as nitrogen compounds where the nitrogen compounds have a valence of from 2 to 5. The nitrogen compounds are inorganic oxygen-containing compounds of nitrogen and may exist within the reaction system as nitrogen monoxide, nitrogen dioxide, nitrogen trioxide, nitric acid, nitrous acid, nitrosylsulfuric acid, nitrosyl-halide and while the overall chemistry can be represented by these compounds, it is well known that other molecular and ionic species exist, both in vapor and liquid states. While other active nitrogen compounds are known to be important and are not completely defined herein, such compounds as $N_2O_3$, $N_2O_4$ and $NO_2Cl$ and certain complexes may exist in the vapor as intermediates. It is to be understood, that for the description of the process of the present invention these other active nitrogen compounds are not considered as part of the major reactions which represent the process of the present invention.

To describe the present invention in a simplified manner, not taking into account all the possible or actual reactions and reactants in the countercurrent flow of the gas phase with the liquid phase, the active nitrogen compounds are converted in the regenerating zone, in the lower portion of the reaction system, from a valence of 2 or 3 to a valence of 4 or 5 such that a stoichiometric amount of the higher valence nitrogen compounds are present in the reaction zone. In over-simplified terms, the active nitrogen exists as the nitrosylsulfuric acid in the liquid phase in the lower portion of the reaction system and is stripped as gaseous nitrogen monoxide and nitrogen dioxide. As the gases rise in the reaction system, the nitrogen monoxide is oxidized to the higher valence state and expressed herein simply as nitrogen dioxide. The nitrogen dioxide reacts stoichiometrically with the hydrogen halide or nitrosyl-halide in a reaction zone to produce the desired halogen in the gaseous phase. Liquid phase reactions may also occur in the reaction system, but characteristic of the present invention is the gaseous recycle of the active nitrogen compounds as described.

Figure 1:
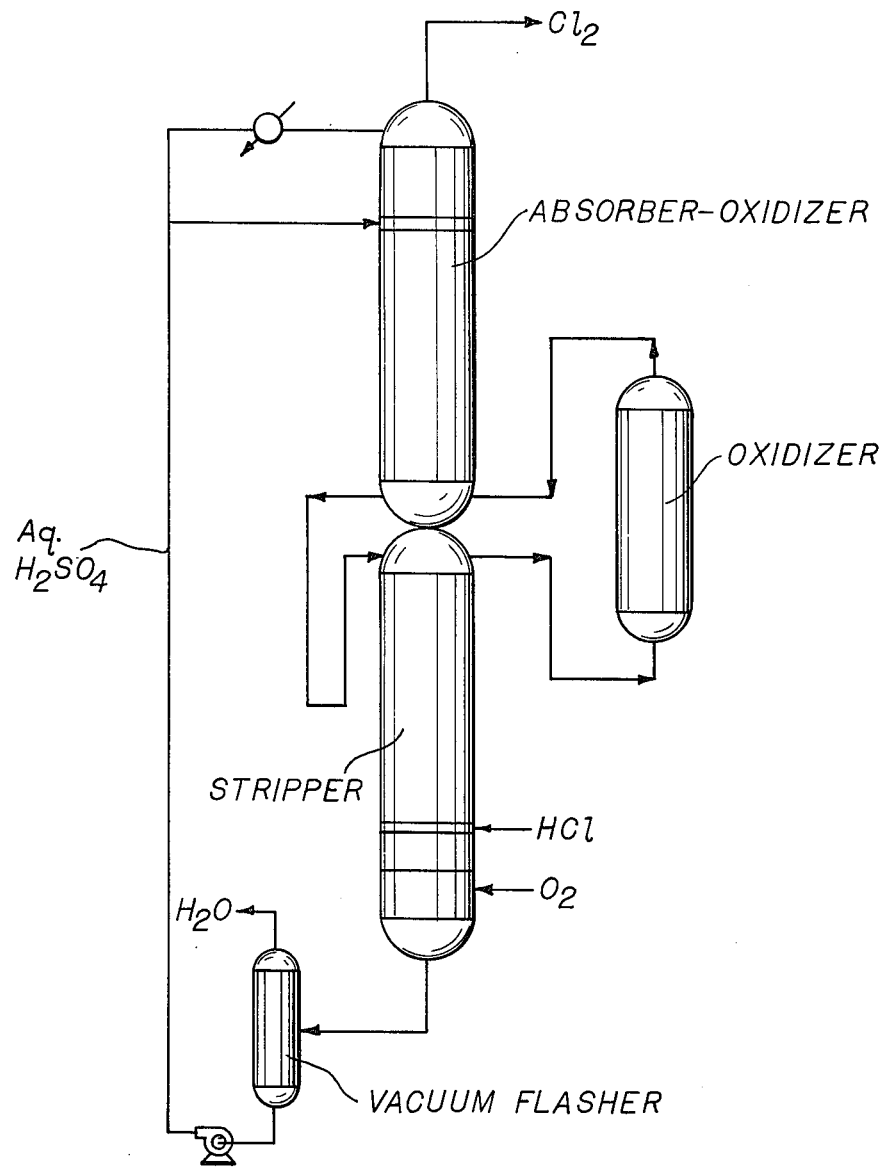
FIG. 1 is a schematic flow sheet of a prior art process for the production of chlorine from hydrogen chloride employing the four steps of recycle-acid stripping, oxidation, absorption-oxidation, and recycle-acid flashing.
Figure 2:
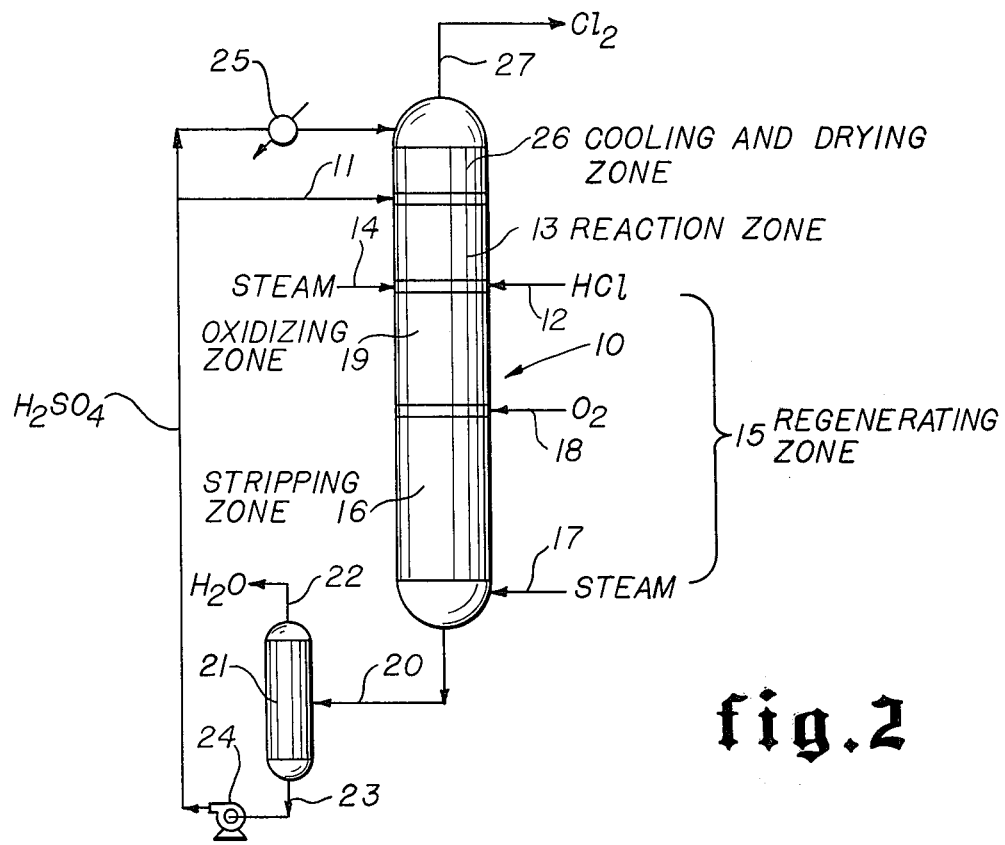
FIG. 2 is a schematic drawing of the simplest form of the process of the present invention.

Referring to FIG. 2 which is a schematic diagram of a flow arrangement of the basic or simplest embodiment of the process of the present invention, basically the reaction system may be a single tower or column 10. Into the top of tower 10 by line 11 is introduced sulfuric acid. Introduced by line 12 countercurrently to the sulfuric acid is the hydrogen halide, preferably hydrogen chloride. Within the tower 10 is a stoichiometric excess of active nitrogen and as pointed out hereinabove the process of the present invention is characterized by the stoichiometric reaction in the gas phase of nitrogen dioxide with the hydrogen halide or nitrosyl-halide in the reaction zone 13. Steam may be introduced into the tower 10 at various points to control and maintain the temperature within the reaction system such as by line 14. The active nitrogen is converted from a valence state of 4 or more to a lower valence state in reaction zone 13 and is regenerated to the higher valence state in regenerating zone 15. Basically, regenerating zone 15 comprises a stripping zone 16 wherein the active nitrogen, predominately nitrosylsulfuric acid, is stripped from the liquid phase as a mixture of nitrogen dioxide and nitrogen monoxide by the introduction of steam by line 17. The nitrogen monoxide is oxidized to the higher valence state by the introduction of oxygen by line 18 in the oxidizing zone 19, the introduction of oxygen also aids in the stripping of the active nitrogen from the sulfuric acid liquid phase stream. After stripping essentially all of the active nitrogen from the liquid phase stream, the stream is removed by line 20 to a vacuum flashing vessel 21 where the water formed in the reaction system is removed overhead by line 22 and the concentrated sulfuric acid is removed by line 23 and pumped by pump 24 for reintroduction to the tower 10 by line 11. A portion of the sulfuric acid is passed through a cooling means 25 and introducing at the very top of the tower 10 to provide a cooling and drying zone 26 for the exiting halogen gas which is removed by line 27.

In summary, the process embodies four steps which are employed in the conversion of the hydrogen halide to the respective gaseous chlorine or bromine:

The stoichiometric reaction of $NO_2$ with the hydrogen halide or nitrosyl-halide in a reaction zone 13, the oxidization of NO with oxygen to regenerate $NO_2$ in a stripping zone 16, and the reconcentration of the recycle acid before recycle of the sulfuric acid to the reaction system or tower 10. The product of the process of the present invention is chlorine or bromine, however, it is preferred to utilize hydrogen chloride for the production of chlorine. After conversion, the chlorine or bromine gas can be dried and liquefied by standard procedures. To characterize the present invention more particularly, each of the zones of the reaction system will be described and the predominant reactions which occur set forth.

REACTION ZONE

According to the present invention, the primary reaction for the productin of chlorine or bromine is the stoichiometric reaction of $NO_2$ with the hydrogen halide or nitrosyl-halide to be converted, according to the following reactions:

$$2NO_2 + 2HCl + 2H_2SO_4 \rightarrow 2HNSO_5 + Cl_2 + 2H_2O \qquad (7)$$
$$2NO_2 + 2NOCl + 4H_2SO_4 \rightarrow 4HNSO_5 + Cl_2 + 2H_2O \qquad (8)$$

The use of the word "stoichiometric" is to indicate the direct reaction of the $NO_2$ according to the equations given, as opposed to a catalytic oxidation, in which the $NO_2$ is first used and then regenerated to be used again and again in the same zone of the process. The word stoichiometric is not meant to express, that for every mole of hydrogen halide or nitrosylhalide only one mole of $NO_2$ is entering the zone. To the contrary, excess $NO_2$ is entering, which is partly absorbed in the sulfuric acid as such, according to the equations:

$$NO_2 + NO + 2H_2SO_4 \rightarrow 2HNSO_5 + H_2O \qquad (9)$$
$$2NO_2 + H_2SO_4 \rightarrow HNSO_5 + HNO_3 \qquad (10)$$

These excesses of $NO_2$ in the present invention further differentiate the process from the catalytic process. It should also be pointed out that it is preferred to leave a small amount of hydrogen halide unconverted.

Thus, in the reaction zone 13, $NO_2$ reacts with the hydrogen halide or nitrosyl-halide to produce the corresponding halide as a gas which flows upwardly countercurrently to the sulfuric acid introduced to the top of the reaction system. The nitrogen compounds are mainly converted to nitrosylsulfuric acid, which flows with the sulfuric acid stream downward. As discussed hereinafter, this nitrosylsulfuric acid is regenerated below the zone under discussion back to sulfuric acid in the liquid phase and nitrogen compounds in the gas phase. As shown in FIG. 2, a portion of the sulfuric acid is cooled and introduced above the major portion to cool and dry the halogen gas before leaving the reaction system.

REGENERATING ZONE

Referring to FIG. 2, below the reaction zone 13 is a regenerating zone 15 in which the active nitrogen is stripped from the liquid stream and oxidized from a low valence state to a valence greater than 3. The oxidation is preferably carried out within the single column or vessel; however, a separate oxidation reactor may be employed. Hence, the regenerating zone 15 comprises a stripping zone 16 and an oxidizing zone 19.

STRIPPING ZONE

Considering first the lowermost zone in FIG. 2, active nitrogen is stripped from the sulfuric acid stream in the stripping zone 16. The introduction of steam results in dilution of the sulfuric acid, while at the same time the temperature is increased. These changed conditions allow the stripping of NO and $NO_2$, following the equation:

$$2HNSO_5 + H_2O \rightarrow NO + NO_2 + 2H_2SO_4 \qquad (11)$$

OXIDIZING ZONE

Between the stripping zone 16 and the reaction zone 13 is the oxidizing zone 19 wherein, the mixture of NO and $NO_2$ is partly oxidized with oxygen. This oxygen can be fed in pure form, or in its natural mixture with nitrogen as air or also as enriched air; it is even possible, though not desirable, to feed the oxygen in the form of ozone. The reaction taking place is:

$$2NO + O_2 \rightarrow 2NO_2 \qquad (12)$$

The kinetics of this reaction have been studied by Bodenstein and, therefore, the conversion of NO and oxygen can be predicted accurately. Especially when undiluted oxygen is used at several atmospheres pressure a practically complete conversion of oxygen can be attained, resulting in production of halogen gas at the top of the system, containing less than 1000 ppm oxygen. This may be accomplished by having a fraction greater than 20% by volume of the nitrogen monoxide stripped passing to the reaction zone as nitrogen monoxide. In all cases sufficient oxygen must be added and sufficient reaction volume or time be allowed to convert a molar amount of NO, equal to the molar amount of halogen to be produced by the system. In this way the desired conversion level can be achieved. Preferably some hydrogen halide is left unconverted to prevent major amounts of nitryl-halide contaminating the halide product gas, according to the equation:

$$HNO_3 + HCl \rightarrow NO_2Cl + H_2O \qquad (13)$$

Most of the nitric acid, formed together with nitrosylsulfuric acid by absorption of $NO_2$ in the reaction zone 13 according to equation (10), is stripped in this zone, according to the equation:

$$HNSO_5 + HNO_3 \rightarrow 2NO_2 + H_2SO_4 \qquad (14)$$

The small amount of nitric acid remaining at the bottom of the oxidizing zone 19 is finally stripped out in the stripping zone 16. It should be pointed out, that the heat, generated by reaction (12), can be used to effect more stripping according to reaction (11). This results in a less clear demarcation of the oxidizing and stripping zones, but with an advantage in utilities. A still lower utilities usage results from injection of oxygen below the steam injection. The oxygen then strips steam from the hot acid thus both cooling the acid stream and requiring a smaller steam addition to the gas stream.

Figure 3:
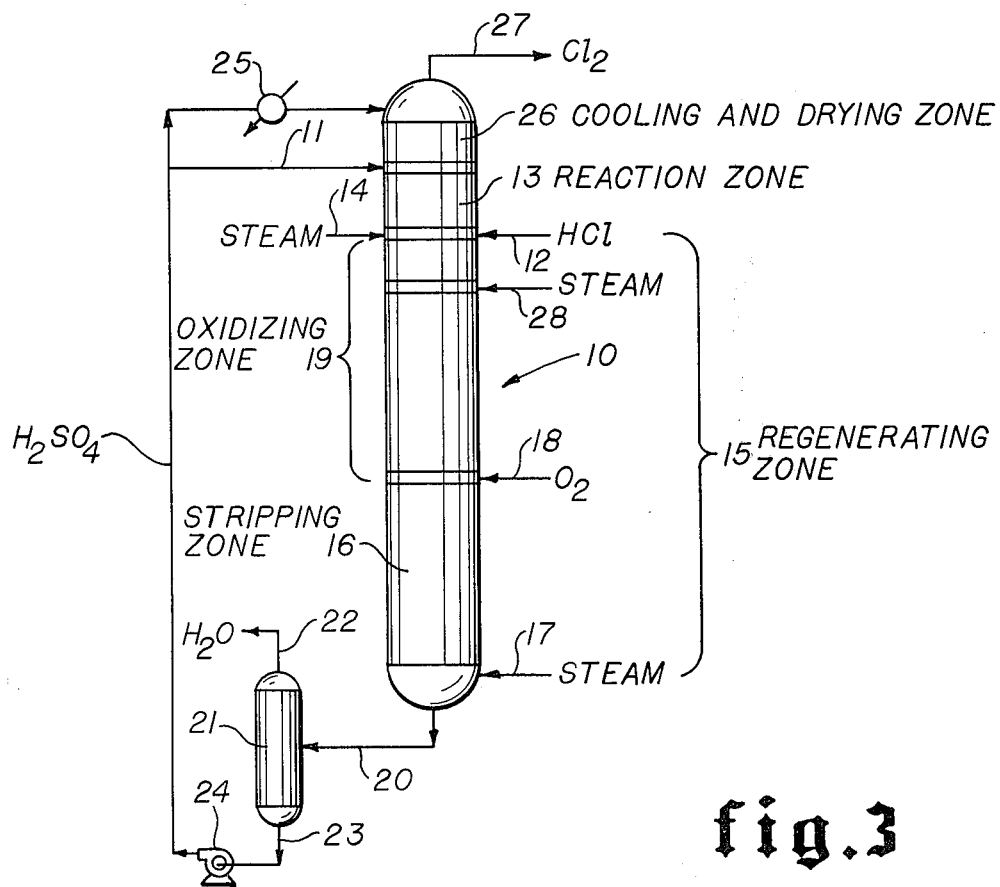
FIG. 3 is another embodiment of one of the simplest forms of the invention.

Referring to FIG. 3, the schematic drawing shows the use of an extra steam injection in the oxidizing zone. Using the same reference numbers used with regard to FIG. 2, the added steam is introduced by line 28. This steam serves to influence the temperature gradient in the system, so as to allow more time for oxidation. The drawback of operating in the modes of FIG. 2 and FIG. 3 is the high temperature at the bottom of the system. This temperature is governed by the steam pressure relationship over sulfuric acid. Assuming a 3 ata operation and an acid strength at the exit of about 74%, a temperature of about 220° C. results. This not only increases the difficulties of finding appropriate materials of construction, but also and most importantly, increases the amount of steam, necessary to warm the acid stream up to the required temperature. Except in the case, where such steam is readily available at little or no cost, use of such large amounts is an economic deterrent to the use of the process.

Figure 4:
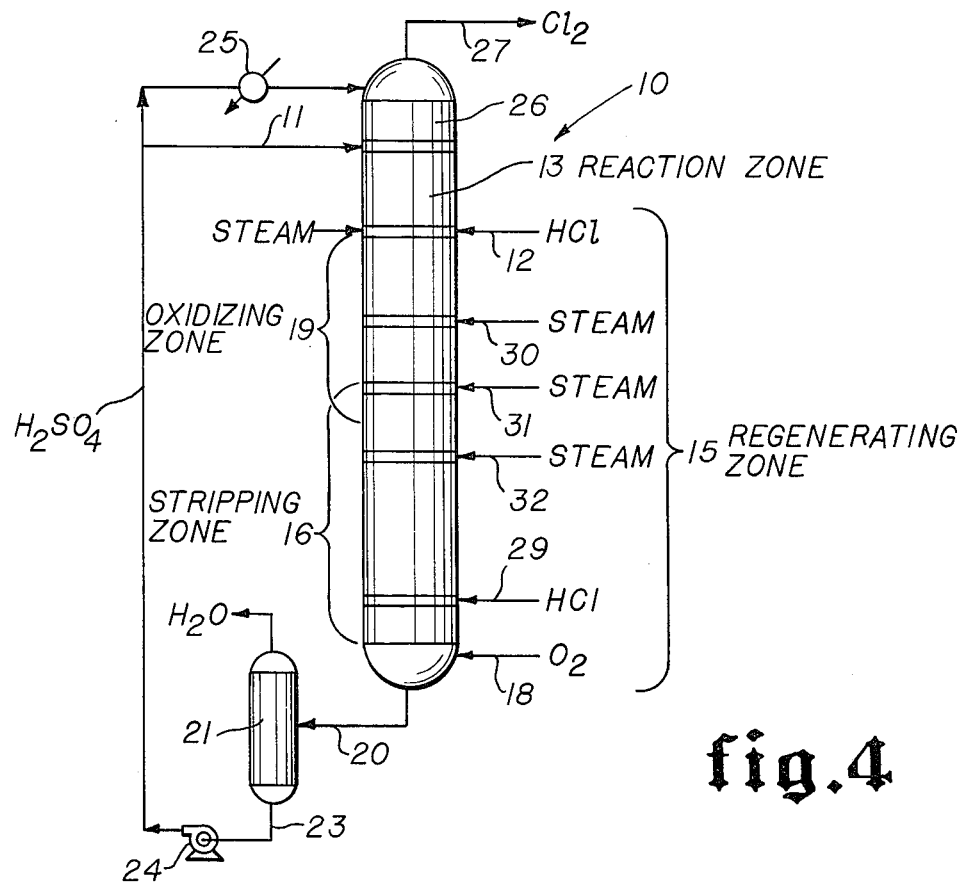
FIG. 4 is a preferred embodiment of the process of the present invention wherein the introduction of the hydrogen halide is at about the lowest point in the system and steam may be fed at various points within the reaction system; and, FIG. 5 is a schematic drawing of the embodiment of the present invention utilizing more than one vessel for the reaction system with a separate oxidizer vessel as part of the regenerating zone of the present invention.

The improved and preferred operation as indicated in FIG. 4 allows as before high conversion of oxygen and operation in a one tower reaction system, but at low and, therefore, much more economically acceptable steam consumption. The important difference is found in the injection of the hydrogen halide feed stream at the bottom of the stripping zone. This has several consequences, all contributing more or less to the saving of steam:

1. As an inert gas the hydrogen halide feed strips steam from the hot acid stream. The amount stripped diminishes the steam to be added. This effect of the hydrogen halide is similar to the effect of the oxygen, injected below the hydrogen halide inlet to remove the last amounts of hydrogen halide from the acid stream.

2. Similar to the stripping action of hydrogen halide in the catalytic form of the prior art process, hydrogen halide strips nitrosyl-halide from acid, containing nitrosylsulfuric acid, according to equation (1). The consequence of this is, that the nitrosylsulfuric acid level in the acid is built up, and also, that the sulfuric acid strength is decreasing, both expressed in relationship from the bottom, going up in the stripping zone. These two changes both facilitate stripping of NO and $NO_2$ at the bottom of the reaction system.

3. A smaller effect is the warming up of the hydrogen halide, which cools down the acid stream at the very bottom of the system. This means, that the acid in the stripping section above this point is warmer. Before, see FIG. 2, this cooling of the acid stream took place in the top of the reaction system, thus, necessitating a compensating warm-up of the acid stream before the stripping. Again, a similar, but still smaller change is the result of injection of the oxygen stream below the hydrogen halide injection.

4. Another effect of the use of hydrogen halide at the bottom of the system is the dilution of the gases at the point of stripping and at the point of oxidation. While this helps the stripping, the oxidation is slowed down to some degree and extra oxidation volume has to be provided. Apart from the injection of hydrogen halide and oxygen at the bottom of the reaction system, FIG. 4 also shows the injection of steam at several places to improve the control of the system, e.g. the thermal gradient within the reaction system can be maintained within desired limits. Again using the same reference numerals as used in FIG. 2 and FIG. 3 to refer to the same structure, the additional structure or changes in structure are the introduction of hydrogen halide by line 29 at the bottom of the tower 10 and the introduction of the oxygen by line 18 below the point of hydrogen halide introduction. The regenerating zone 15 still has a stripping zone 16 and oxidizing zone 19 but these zones are not as well defined as in the simple embodiment. The addition of steam in this embodiment of FIG. 4 may be lines 30, 31 and/or 32.

Figure 5:
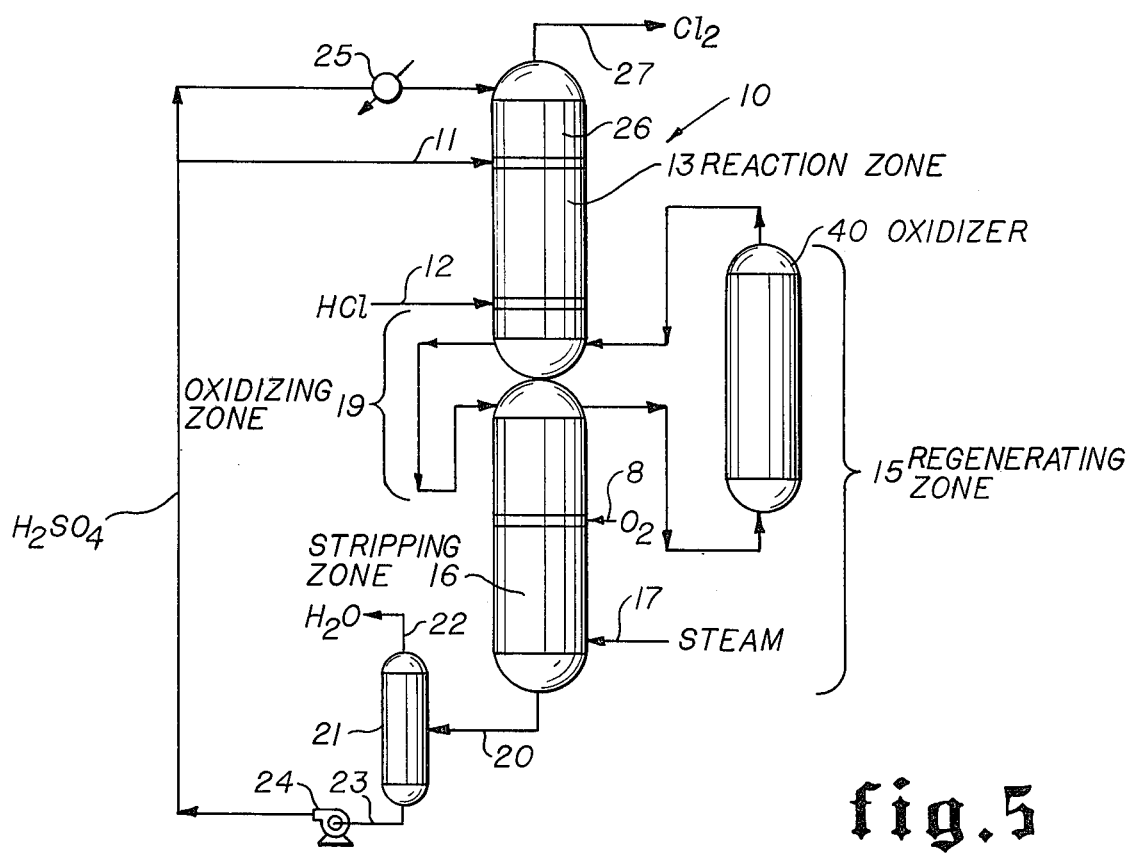

To reduce the size of a single tower due to the volume necessary to obtain adequate oxidation volume, an embodiment such as shown in FIG. 5 with an outside oxidizer 40 may be employed. In this embodiment the reaction system 10 is a series of vessels but otherwise is essentially the same structure as in FIG. 2, the same reference numerals being used to indicate the same structure. Not only may more time be taken using an outside oxidizer 40 at a given condition, but even some cooling can be applied to oxidize at somewhat lower temperature, benefiting from the better $NO-O_2-NO_2$ equilibrium at lower temperatures. The final oxygen level in the halogen gas can thus be brought down to about 11 ppm.

The different forms of the process of the present invention are characterized by the retainment of the active nitrogen within the reaction system in a stoichiometric excess over the amount of hydrogen halide converted in the system. The excess may be anywhere from 1.1 to 4 and preferably from 2 to 3.5 times the amount of hydrogen halide converted in the system. The active nitrogen may be introduced to the system initially as any one of the inorganic oxygen-containing compounds as set forth hereinabove. After start-up only small amounts of active nitrogen have to be added to compensate for the loss of trace amounts in liquid and gas streams, leaving the system, and through side reaction, predominately with impurities in the feed. The process according to the present invention is carried out under pressures which may vary from about atmospheric conditions to about 8 atmospheres pressure, preferably from about 1 to about 3 atmospheres pressure. The temperatures in the process differ in that at the top about ambient temperature follows from the use of the cold acid stream. The highest temperature in the process can be about 250° C., but it is preferred to use process conditions, which allow maximum temperatures not higher than about 200° C.

Because of the conditions, which may be employed in the process of the present invention, this process has certain advantages both from the process and mechanical point of view. These advantages are:

Low pressures and temperatures reducing the severity of the corrosiveness of the fluids and gases handled.

A single tower may be employed such as a brick-lined tower, thus not requiring expensive acid handling materials such as tantalum-lining.

Possibility to handle aqueous hydrogen halide streams as well as anhydrous feeds. The different aspects of the process and their advantages can be seen from the following examples:

EXAMPLE 1

This example is operating at 3 ata on the mode, indicated in FIG. 3, with the difference, that the oxygen is injected at the bottom of the reaction system. The acid recycle is 800,000 lbs./hr of 80 wt% sulfuric acid. Most of this is recycled hot, directly from the flasher, at a temperature of about 130° C. The cold acid stream is about 95,000 lbs./hr and is injected at about 45° C. The total amount of steam used is 2,500 MPH (mole per hour) of which 200 MPH is injected at the top of the oxidation zone for control purposes; the main amount is injected at the bottom of the reaction system above the oxygen injection. The oxygen gas stream contains 150 mph oxygen. It strips out of the hot acid stream at the very bottom of the system about 680 MPH steam. The acid stream exits at about 202° C., and its acid strength is then about 75.6 wt%. 615 MPH HCl are injected above the oxidation zone. At the point of the highest steam-injection 0.1 MPH $HNO_3$ is injected to maintain catalyst inventory. The total of the active nitrogen compounds stripped is at its maximum about 1000 MPH in the gas phase. At the end of the oxidation zone the composition is roughly 850 MPH $NO_2$, 150 MPH NO, about 460 MPH steam and traces of oxygen. The gas produced at the top of the reaction system contains 300 MPH of chlorine, 15 MPH of hydrogen chloride, about 0.15 MPH $O_2$ (about 500 ppm by weight of chloride produced), and not more than traces of active nitrogen compounds. The maximum acid temperature is 220° C.

EXAMPLE 2

This example is operated in the mode, indicated by FIG. 4. Only two steam streams are used. The acid recycle is about 800,000 lbs./hr of 81 wt% acid. Most of this is recycled hot at about 135° C. The cold sulfuric acid is 95,000 lbs./hr and is injected at about 45° C. The total amount of steam used is 1,900 MPH, of which 200 MPH is injectd at the top of the oxidation zone. At the outlet at the bottom the acid stream is at about 192° C. Here 150 MPH oxygen are being injected. Above the oxygen contacting zone, in which only about 80 MPH steam are being stripped, 200 MPH HCl are being injected. This causes stripping hot only of steam, but also of NOCl, NO and $NO_2$. At the top of this zone the composition of the gas is approximately 450 MPH steam, 109 MPH NOCl, 51 MPH HCl, 20 MPH $Cl_2$, 33 MPH NO, 53 MPH $NO_2$ and 134 MPH $O_2$. The temperature at this point, which is the hottest point in column, is about 208° C. Also at this point, 1700 MPH steam is injected. This causes more stripping of NO and $NO_2$, followed by oxidation of NO. When the oxygen content is down to about 0.1 MPH, the rest of the steam is injected, soon followed by the rest of the HCl (420 MPH). The product gas at the top of the reaction system, after cooling by the cold acid stream, contains 300 MPH chlorine, 20 MPH HCl, 0.1 MPH $O_2$, and not more than traces of active nitrogen compounds.

The nature and objects of the present invention having been completely described and illustrated and the best mode thereof contemplated set forth, what I wish to claim as new and useful and secure by Letters Patent is:

1. A process for producing chlorine or bromine from the respective hydrogen halide in a reaction system having a reaction zone at the top of the system and a regeneration zone in the lower portion of the system and maintaining within said system a stoichiometric excess of active nitrogen with respect to said hydrogen halide in said system which comprises:
   introducing sulfuric acid to the top of said reaction system to flow downwardly as a liquid phase and maintain the active nitrogen within said system, a part of which is converted to nitrosylsulfuric acid;
   introducing steam to said liquid phase in the regenerating zone of said reaction system to maintain the active nitrogen within said system whereby said nitrosylsulfuric acid is stripped from said liquid phase and regenerated as a mixture of nitrogen monoxide and nitrogen dioxide;
   introducing below said reaction zone said hydrogen halide in an amount which is stoichiometrically less than the active nitrogen present in said system whereby said hydrogen halide enters said reaction zone as hydrogen halide or nitrosylhalide;
   introducing oxygen to said regenerating zone in an amount sufficient to oxidize a sufficient quantity of said nitrogen monoxide to gaseous nitrogen dioxide, said oxidization occurring in an oxization zone located at the upper portion of said regenerating zone whereby at least a stoichiometric amount of said gaseous nitrogen dioxide is introduced to said reaction zone as compared to hydrogen halide or nitrosylhalide; and
   reacting in said reaction zone said nitrogen dioxide with said hydrogen halide or nitrosylhalide to produce gaseous chlorine or bromine which flows out of said system countercurrently to said liquid phase.

2. A process according to claim 1 wherein said hydrogen halide is introduced to said reaction system containing water.

3. A process according to claim 2 wherein aqueous hydrogen chloride is evaporated outside said reaction system and said hydrogen chloride containing water is introduced near the bottom of said reaction system.

4. A process according to claim 1 wherein in said oxidation zone said nitrogen monoxide is oxidized with oxygen to nitrogen dioxide, the extent of said oxidation being such that a fraction greater than 20% by volume of said nitrogen monoxide stripped passes to said reaction zone as nitrogen monoxide.

5. A process according to claim 1 wherein said hydrogen halide is introduced to said reaction system as anhydrous hydrogen halide.

6. A process according to claim 1 wherein steam is introduced into said reaction system at the top of said oxidation zone located immediately below said reaction zone.

7. A process according to claim 1 wherein said reaction system is a single tower.

8. A process according to claim 1 wherein a portion of said regenerating zone is a separate vessel.

9. A process according to claim 1 wherein anhydrous hydrogen chloride is introduced near the bottom of said reaction system.

10. A process according to claim 1 wherein said hydrogen halide is hydrogen chloride.

11. A process according to claim 1 wherein said active nitrogen is maintained within said system in a stoichiometric excess of about 1.1 to 4.0 over said hydrogen halide added to said system.

12. A process according to claim 1 wherein the pressure is maintained at 1 to 4 atmospheres.

13. A process according to claim 1 wherein the temperature within the reaction system does not exceed 200° C.

14. A process according to claim 1 wherein said reaction system is a single tower and the pressure is maintained at 1 to 3 atmospheres and the temperature does not exceed 200° C.

* * * * *